(12) United States Patent
Vicuna Marin et al.

(10) Patent No.: US 10,302,406 B2
(45) Date of Patent: May 28, 2019

(54) MECHANICAL DEVICE FOR CARRIAGE, HANDLING AND LAYOUT OF AN EXPLOSIVE CONE USED TO RELEASE HANGING ROCKS IN UNDERGROUND MINES

(71) Applicants: CORPORACIÓN NACIONAL DEL COBRE DE CHILE, Santiago (CL); CODELCOTEC SPA, Santiago (CL)

(72) Inventors: Mario Vicuna Marin, Santiago (CL); Gaston Pinilla Narvaez, Santiago (CL); Ernesto Arancibia Villegas, Santiago (CL); Gabriel Gonzalez Loguercio, Santiago (CL)

(73) Assignee: CODELCOTEC SPA, Santiago, Region Metropolitana (CL)

( * ) Notice: Subject to any disclaimer, the term of this patent is extended or adjusted under 35 U.S.C. 154(b) by 0 days.

(21) Appl. No.: 15/519,488

(22) PCT Filed: Oct. 14, 2015

(86) PCT No.: PCT/IB2015/057866
§ 371 (c)(1),
(2) Date: Apr. 14, 2017

(87) PCT Pub. No.: WO2016/059567
PCT Pub. Date: Apr. 21, 2016

(65) Prior Publication Data
US 2017/0241758 A1    Aug. 24, 2017

(30) Foreign Application Priority Data

Oct. 15, 2014 (CL) .................................. 2767-2014

(51) Int. Cl.
*F42D 3/04* (2006.01)
*F42D 1/22* (2006.01)
(Continued)

(52) U.S. Cl.
CPC ............ *F42D 3/04* (2013.01); *B25J 15/0071* (2013.01); *B25J 15/10* (2013.01); *B25J 15/103* (2013.01); *F42D 1/22* (2013.01)

(58) Field of Classification Search
CPC ..... F42D 1/08; F42D 1/22; F42D 3/04; F42D 5/02; F42D 5/04; B25J 15/08; B25J 15/10; B25J 15/0071
(Continued)

(56) References Cited

U.S. PATENT DOCUMENTS

| 4,621,562 | A | * | 11/1986 | Carr ......................... B25J 5/007 180/22 |
| 4,918,991 | A | * | 4/1990 | Bucher .................. B25J 15/103 376/261 |

(Continued)

FOREIGN PATENT DOCUMENTS

| EP | 0105656 A2 * | 4/1984 | ................ B25J 5/02 |
| EP | 3098031 A1 * | 11/2016 | .............. B25J 5/007 |

(Continued)

OTHER PUBLICATIONS

State Intellectual Property Office of the People's Republic of China, First Office Action and Search Report, Application No. 201580056993. 7, dated Jun. 20, 2018, 7 pages.

*Primary Examiner* — James S Bergin
(74) *Attorney, Agent, or Firm* — Jack M. Cook; Quarles & Brady LLP

(57) ABSTRACT

A mechanical device that has the ability to manage and set explosives cones in the rocks that form the hanging, which can be operated remotely, avoiding the danger of the current state of the art where operators place explosive using bamboo sticks, before detonating them, causing an imbalance in the hanging. The mechanical device also known as
(Continued)

cone-holder, is located at the end of an automated and semi autotransportable manipulator arm for releasing hangings.

21 Claims, 5 Drawing Sheets

(51) Int. Cl.
 *B25J 15/00* (2006.01)
 *B25J 15/10* (2006.01)
(58) Field of Classification Search
 USPC ............. 102/301, 313, 321; 86/50; 299/13; 89/1.11, 1.1; 175/1–4.6
 See application file for complete search history.

(56) References Cited

U.S. PATENT DOCUMENTS

| | | | | |
|---|---|---|---|---|
| 6,113,343 A | * | 9/2000 | Goldenberg | B25J 5/005 239/587.2 |
| 7,363,844 B2 | * | 4/2008 | Barton | B63C 7/20 114/313 |
| 8,727,410 B2 | * | 5/2014 | Jones | B25J 5/005 294/183 |
| 8,851,541 B2 | * | 10/2014 | White | B25J 15/0019 294/2 |
| 9,010,246 B2 | * | 4/2015 | Leppanen | F42D 1/22 102/306 |
| 9,094,082 B1 | * | 7/2015 | Holz | H04B 7/14 |
| 9,506,728 B2 | * | 11/2016 | Bosscher | F41H 11/12 |
| 2010/0068024 A1 | * | 3/2010 | Agens | B66C 3/18 414/729 |
| 2014/0007730 A1 | * | 1/2014 | DeLouis | B25J 15/0009 74/490.03 |
| 2016/0354932 A1 | * | 12/2016 | Bosscher | B25J 13/025 |

FOREIGN PATENT DOCUMENTS

| | | | |
|---|---|---|---|
| WO | WO-2011127492 A1 * | 10/2011 | ............ F42D 1/22 |
| WO | WO-2012150541 A2 * | 11/2012 | ......... B08B 9/0933 |

* cited by examiner

MECHANICAL DEVICE FOR CARRIAGE, HANDLING AND LAYOUT OF AN EXPLOSIVE CONE USED TO RELEASE HANGING ROCKS IN UNDERGROUND MINES

CROSS-REFERENCE TO RELATED APPLICATION

This application represents the national stage entry of PCT International Application PCT/IB2015/057866 filed Oct. 14, 2015, which claims the benefit of Chile Patent Application 2767-2014, filed Oct. 15, 2014. The contents of these applications are hereby incorporated by reference as if set forth in their entirety herein.

This invention is related to a mechanical device for carrying, handling and placing an explosive cone to release overhanging rocks in underground mines. Said mechanical device has the capacity of handling and fixing explosive cones to the rocks that form the overhang, which can be operated remotely, avoiding the risk the current operation presents, where the operator, by using bamboo sticks, places the explosive charge up high to later detonate it and provoke instability in the overhang. The mechanical device, also called cone-carrying device or simply cone-carrier, is located at the end of the semi-automated and self-transportable handling arm which was presented in our Chilean application number 1970-2014

BACKGROUND

For decades, Codelco's underground mines have successfully used the block and panel caving method, achieving high yield rates and competitive costs. At the beginning of the $20^{th}$ century, the deposits the corporation exploited were on secondary rock, which has a medium to intense degree of fracturing, offering a highly favorable environment to apply the blasting system. For some years now, this type of mining has been facing ever more demanding and difficult scenarios, having to adapt to deeper deposits, with more competent rock masses and environments that require greater efforts.

The underground exploitation of higher competence unprocessed ore through block caving has meant an important increase in the material's granulometry, which is generated as a result of the natural breakup of the rock mass. This situation has caused the mineral extraction operation to be faced with frequent interruptions due to the presence of large masses in the extraction point (trenches), which are present as boulders or oversize muck on the floor or as overhangs. One of the most complex and riskier interferences to solve is caused by the blockage of these boulders inside the trench (trench overhang) at heights that vary between 4 and 12 meters.

The problem of trench overhangs, typical in block caving operations, has been faced using high risk procedures. The commonly used solution consists in placing explosives with bamboo tamping. Usually, this operation consists of placing pentolite cones tied to the end of the bamboo sticks, which lift it, put it in contact with the rock and hold it until the loosening blast is done. This practice requires that the operator in charge of placing the explosives approaches the mouth of the area, in order to see the position where the explosive will be located and to place it in height, an action that leaves them greatly exposed and vulnerable to risk, in case a sudden mineral flow occurred.

An important progress for the underground mining industry has been achieved with the development and implementation of a semi-automated and self transportable handling arm to release overhangs, which was presented in our Chilean patent application number 1970-2014, and its content forms part of the present application.

In the state-of-the-art there are no mechanical devices adapted to carry, handle and place an explosive cone, when releasing overhangs in underground mines; though there are some devices to carry and/or fix explosives, none of them has the characteristic of carrying an explosive cone that can also be remotely operated and that has the capacity to fix the explosive cone on an overhang. In this way we have, for example, the U.S. Pat. No. 2,837,997, which describes a device used in seismic explorations where an amount of vertically separated explosives are lowered through an impact hole and blasted inside said hole. Said device consists of a long cylindrical container which is filled with explosives; on the external area of the container, there are split rings used to fix the external wall of the container to an end of it. The U.S. Pat. No. 4,089,250 describes a support to hold an explosive cartridge in a chamber that consists of: a cylinder that is substantially closed on one end and open on the other, designed to be received into the chamber. Said cylinder has a bigger inside diameter on the open end and gas exhaust ports near to the closed end; a reel of such a size that allows adapting it inside the cylinder; indication means and indicator joined to the observable reel on the closed end of the cylinder; spring means to push the reel towards the open end of the cylinder and force the support's cartridge support. In our Chilean invention patent application 1117-2010, a mobile system to place elements at a height, preferably inside an underground mine, is described; this system includes an object-carrying system, which is individualized as an explosive carrier system, but there are no extensive specifications of the system itself. In our Chilean invention patent application 1970-2014, a semi-automated, self-transportable and remotely operated handling arm is described, for the mapping and release of overhangs in extraction points of underground mines. In said request, a cone-carrier system is also mentioned; however, no further information is provided about said cone-carrying device.

As it can be seen, there are no mechanical devices in the state-of-the-art for the carrying, handling and placement of an explosive cone to release overhangs in underground mines.

SUMMARY OF THE INVENTION

The mechanical device for the carrying, handling and placing of an explosive cone, also called cone-carrying system or simply cone-carrier, has a field of application in overhang release operations in extraction points in underground mines. Said cone-carrying device is operated remotely from an operation control device and is located on the end of a semi-automated and self-transportable arm for overhang release, like the one presented in our Chilean invention patent application number 1970-2014.

The role of the cone-carrying device is to safely transport the explosive cone to the place in the overhang where this should be located, to then firmly attach it to the rock and, finally, move away from the overhang release area.

The operation conditions of the cone-carrying device correspond to those of an underground mine, with high presence of dust and humidity and temperature of between 4° C. and 25° C.

Therefore, this invention presents: a mechanical device for the carrying, handling and placing of an explosive cone for the release of overhangs in underground mines, which can be attached to an semi-automated handling arm where the device consists of: (i) an explosive cone gripping system; (ii) a fitting spring; (iii) a support plate; (iv) two pneumatic thrust cylinders; (v) a pneumatic motor for rotation; (vi) a pneumatic motor for inclination with an endless screw and crown; (vii) a joint support; and (viii) a protective cover which covers the pneumatic cylinder and the pneumatic motors.

Also, the cone-carrying device includes an orientation and placement system made up of six sensors that are directed to the location plane of the placing target which, together with a video camera included in the device and a blow valve for the cleaning of the camera, make up the inspection and orientation system that allows the remote operation and proper placement of the explosive cone on the overhang.

The gripping system of the cone-carrying device can be formed in three different ways, which are: (i) the gripping system includes at least three pneumatic cylinders with penetration points; (ii) the gripping system includes a tweezers system which incorporates spike like penetration elements; and (iii) the gripping system includes a tweezers system that grabs on the cone's surface using the anchoring of a ring system previously attached to the cone. Preferably, the gripping system includes at least three pneumatic cylinders with penetration points, being these penetration points parallel to the support plate or else, perpendicular to the side face or the explosive cone's casing.

As complementary, but not less important, elements, the cone-carrying device also includes buffering inserts (rubber or sponge) to support and fit the explosive cone, and a ring system for alternatives (i) and (ii), which protect the pneumatic grippers.

DETAILED DESCRIPTION OF THE INVENTION

Figure 1:
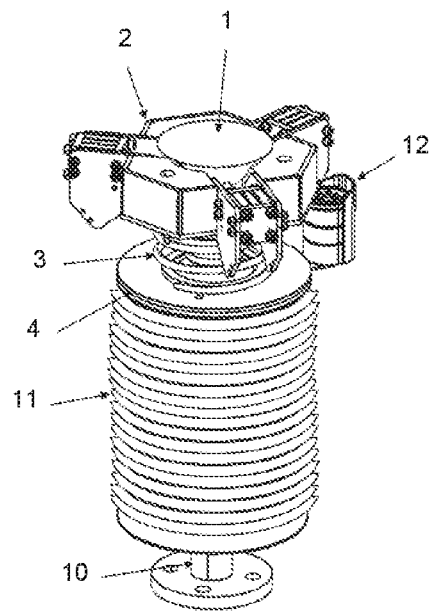
FIG. 1 represents a perspective view of the cone-carrying device with the gripping system of three pneumatic cylinders with penetration points.

As it has been said before, work in underground mines involves operational and safety difficulties that are typical and specific of the location where they take place; this is why, aside from working in small galleries, the environment where the works take place is also a problem as in many cases, the environmental humidity, dust and low visibility have a direct effect on the operation and lifespan of the machinery and devices used for ore extraction. Therefore, all the aforementioned factors must be considered when designing the diverse types of machinery and work devices. For releasing overhangs, in addition to the aforementioned factors, it is also important to consider the possible instability of the rock making the overhang, which translates into a possible unexpected breaking off which could cause an accident for a worker or damages to the machine being used, with the resulting economic loss. For this reason, it would also be inadvisable to use expensive materials that, in case of an accident, could lead to a significant economic loss. The cone-carrying device of this invention is a complement of the handling arm system for overhang release that we described in our Chilean invention patent application 1970-2014. Both were developed thinking about the relevance of designing equipment, in the particular case of a cone-carrying device, that is efficient, agile and reliable, using materials that can withstand the operation conditions and that, at the same time, whose cost is not high in case of being lost due to an accident but that, more importantly, can avoid the direct handling of an explosive cone by a worker on the overhang itself. Also, and particularly referring to the cone-carrying device, it has been suitably developed to avoid possible risks of an unwanted explosion for any worker who has to handle them when releasing an overhang.

The study of the problem and its possible solutions translated into a conceptual development through a comparative analysis of several alternatives, establishing that the best option to solve the technical problem is the cone-carrying device with a gripping system for the explosive cone done safely, easily and that can be operated remotely when fixing the explosive cone to the base of the overhang. Thus, in order to carry out the overhang releasing operation, it was established that it is necessary to have a cone-carrying device that must comply with at least the following:

Using a pneumatic gripping system with different triggering modes; made of duralumin (non-ferrous as per the norm) and the incorporation of an automatic mechanic fine-tuning system.

Having a protection bellow against chemical attacks, dust, and humidity, among others that protects the main body of the device.

The whole system (motors, pieces, cylinders) must be covered with an anti-static protection layer.

Using pneumatic motors that transfer the forces in the movements.

Being able to be attached to a handling arm system.

Must operate in underground mining conditions, with high presence of dust and humidity.

All electric power, pneumatic and hydraulic ducts that feed the cone-carrying device must be attached to the handling arm system.

As a result of this, the solution to the technical problem presented was the creation of a cone-carrying device that includes, as main elements, an explosive cone gripping system; pneumatic thrust cylinders; a pneumatic motor for rotation; a pneumatic motor for inclination with endless screw and crown; and a protective covering that covers the pneumatic cylinder and the pneumatic motors.

Conceptually, the cone-carrying device is thought as a safe, agile device with quick and precise movements, which is stable and able to exercise little pressure on the explosive charge being placed on the boulders that make the overhang. Therefore, in this invention, as can be seen in FIGS. 1 to 8, a cone-carrying device with the following characteristics is shown: (1) remotely operated, to release overhangs in extraction points of underground mines, characterized because it has (i) a gripping system for the explosive cone (2), (ii) a fitting spring (3), (iii) a support plate (4), two pneumatic thrust cylinders (5, 6), (v) a pneumatic motor for rotation (7), (vi) a pneumatic motor for inclination (8) with an endless screw and crown system (9), (vii) a joint support (10), and (viii) a protective cover (11) that covers the pneumatic cylinder and the pneumatic motors. The cone-carrying device can be remotely operated using a control system that regulates its rotational movements, prismatic device and the gripping of the explosive cone.

Also, the cone-carrying device includes an inspection and orientation system made up of a video camera (12), six sensors and a blowing valve for cleaning (not shown in the figures). The six orientation sensors are located on the edge of the gripping system and are made up of three infrared sensors to measure the presence of objects and three ultrasound sensors to measure distance, all of them oriented in the direction and sense of the sticking target on the location plane, that is, the surface where the explosive cone will be fixed.

Figure 6:
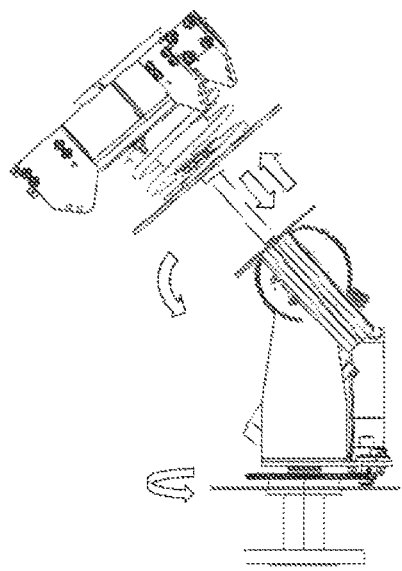
FIG. 6 represents a side view, with a 45° inclination, of the cone-carrying device with the gripping system of three pneumatic cylinders with penetration points.
Figure 7:
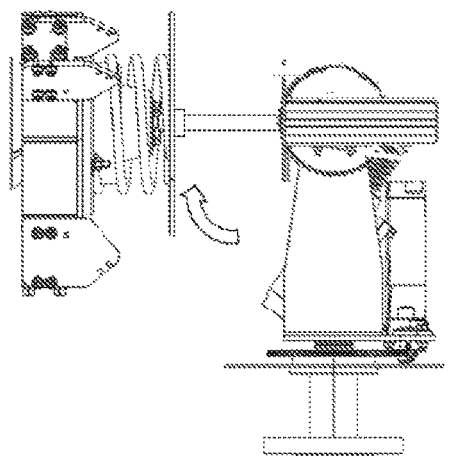
FIG. 7 represents a side view, with a 90° inclination, of the cone-carrying device with the gripper gripping system.
Figure 8:
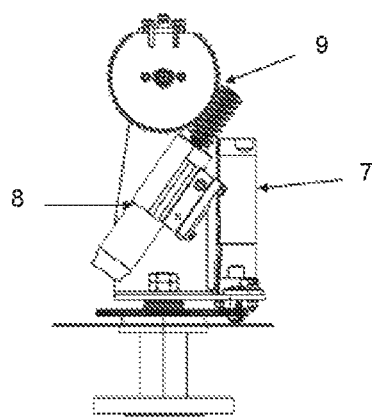
FIG. 8 represents a close-up of the pneumatic motor for inclination with an endless screw and crown system.

As can be seen in FIGS. 6 and 7, the cone-carrying device has the ability to lean at 45° and 90° to properly adapt where the explosive cone will be fixed.

The explosive cone gripping system, located in the upper part of the cone-carrying device, can be formed in different ways: (i) a gripping system that includes, at least, three pneumatic cylinders with penetrating points (FIGS. 1 and 3); or (ii) a gripper system (FIGS. 2 and 4).

Figure 9:
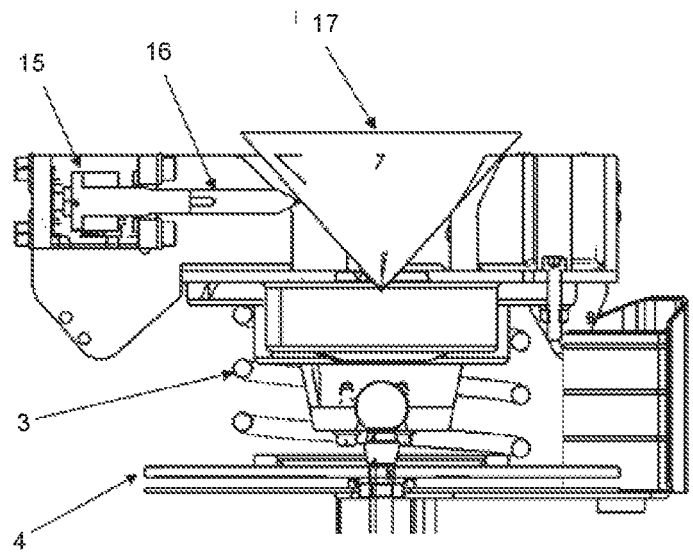
FIG. 9 is a cross-cut view of the cone-carrying device with gripping system of three pneumatic cylinders with horizontal penetration points, and the explosive cone.
Figure 10:
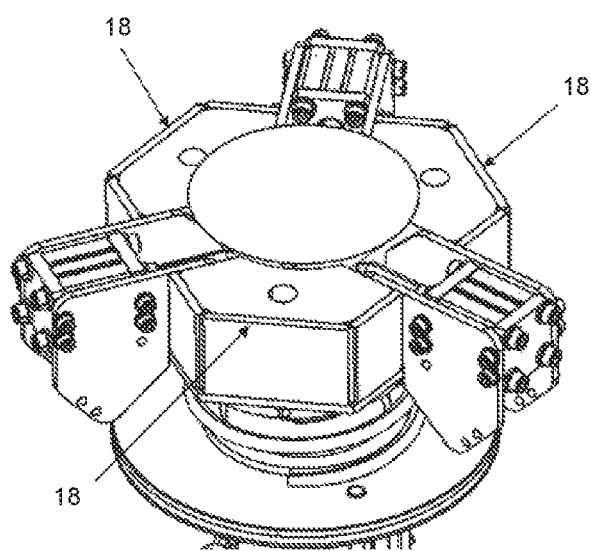
FIG. 10 is an upper perspective view of the gripping system with three pneumatic cylinders with horizontal penetration points.
Figure 11:
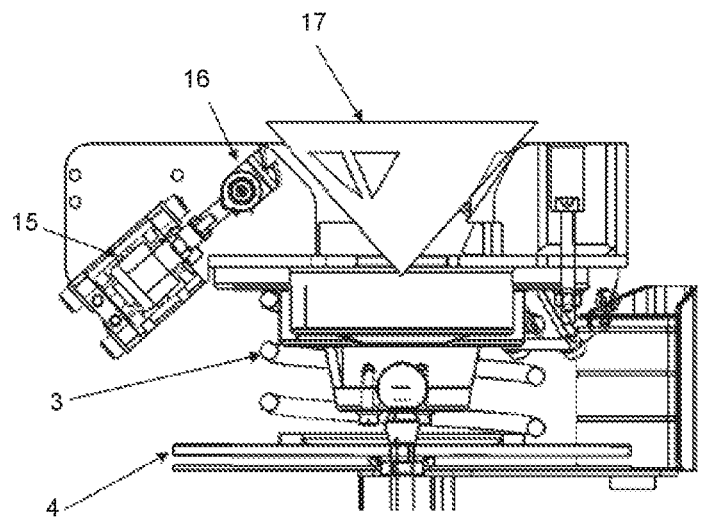
FIG. 11 is a cross-cut view of the cone-carrying device with gripping system of three pneumatic cylinders with penetration points perpendicular to the faces of the explosive cone and the explosive cone itself.
Figure 12:
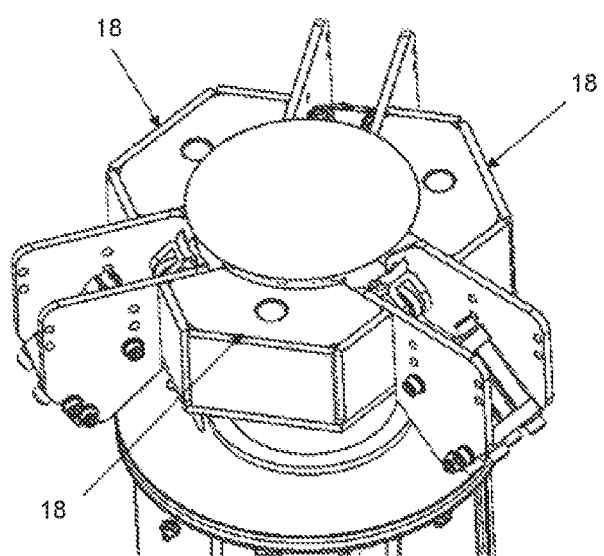
FIG. 12 is an upper perspective view of the gripping system with three pneumatic cylinders with penetration points perpendicular to the faces of the explosive cone.

In a preferred mode of this invention, the gripping system will be made up of three pneumatic cylinders (15) with penetration points (16). In FIGS. 9 and 10 it is possible to see the gripping system that includes three pneumatic cylinders with horizontal penetration points; in the figures it is possible to see that both the pneumatic cylinder (15) and the penetration points (16) are parallel to the support plate (4) and that their contact with the wall of the explosive cone (17) will be oblique. In FIGS. 11 and 12 it is possible to see the gripping system made up three pneumatic cylinders (15) with penetration points (16) perpendicular to the side face or casing of the explosive cone (17). In FIGS. 10 and 12 it can be clearly seen that the gripping system has three independent buffering inserts to support the explosive cone in its different sizes. These buffering inserts (18) are made of a soft material, such as rubber, sponge or others with similar characteristics.

Figure 2:
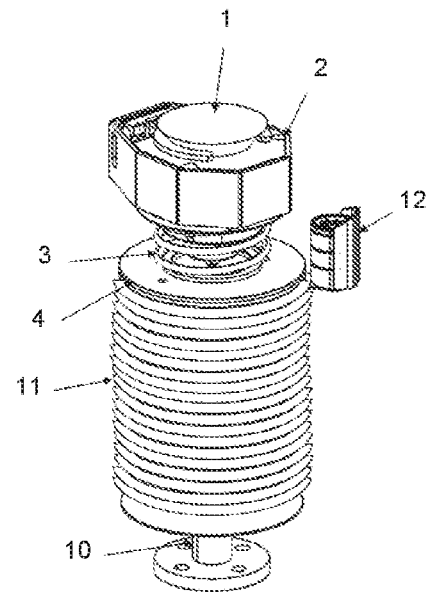
FIG. 2 represents a perspective view of the cone-carrying device with the gripper gripping system.
Figure 3:
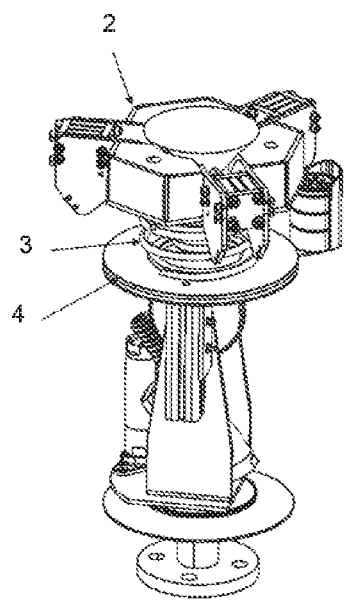
FIG. 3 represents a perspective view of the cone-carrying device with the gripping system of three pneumatic cylinders with penetration points and no protective cover.
Figure 4:
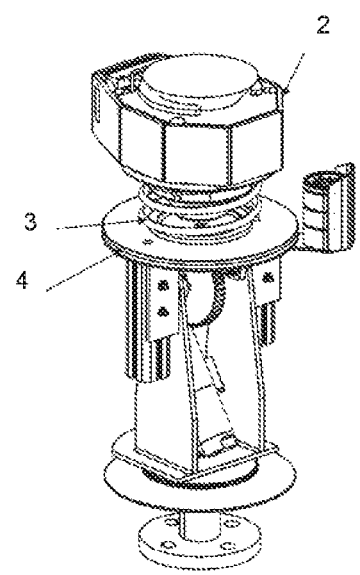
FIG. 4 represents a perspective view of the cone-carrying device with the gripper system and no protective cover.
Figure 5:
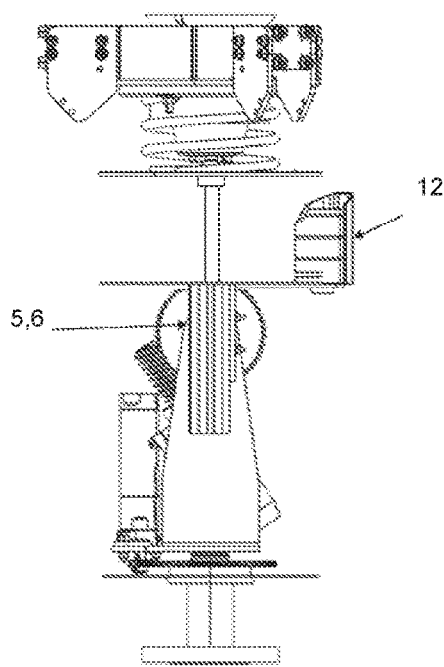
FIG. 5 represents a side view, with no inclination, of the cone-carrying device with the gripping system with three pneumatic cylinders with penetration points.

In an ancillary modality of this invention, the gripping system will be made up of a gripper system incorporating spike like penetration elements (as shown in FIGS. 2 and 3), that includes a mechanism with 2 protection rings, one located on the gripper system and the other under it. This gripping system corresponds to pneumatic triggering grippers including parallel movement pneumatic devices to grip the cone; also, a rubber insert is included that acts as a second line of support at the base of the explosive cones, allowing it to adapt to the different sizes of cone.

In a third mode of this invention, the gripping system includes a gripper system that grips the surface of the cone by attaching to a ring system previously stuck to the cone. This gripping system corresponds to pneumatic triggering grippers that include a parallel movement pneumatic device to grip the cone; also, a rubber insert is included that acts as a second line of support at the base of the explosive cones, allowing it to adapt to the different sizes of cone.

In the gripping where the ring system is used, the latter allows the fixing elements to be hidden once the explosive cone is released.

Equipment

The mechanic device for the carrying, handling and placement of an explosive cone, also called cone-carrying device or simply cone-carrier, like the one described in this invention patent application, has a field of application in overhang release operations at extraction points in underground mines. As was said before, said cone-carrying device is remotely operated using an operation control device and the device itself will be located mainly at the end of a handling arm to release overhangs, although this position can vary.

The components and materials of the cone-carrying device are generally, widely known by any technician in the matter. The most sophisticated components are indicated below:

Fitting spring (3): this is mainly made up of a steel spring which will allow an angle adjustment of approximately 20°.

Pneumatic thrust cylinders (15) for the gripping system (2): these must be double acting, simple rod, moved using compressed air and with a work speed of 50 to 500 mm/s; the preferred model is DOUBLE ACTING CYLINDER 25×15 MALE ROD END CQSB25-15DM.

Pneumatic grippers for the gripping system (2): the effective force per side of the gripper must be 90 [N] or 9.18 [Kg], enough to penetrate the cardboard incorporated as casing in the explosive cone. The preferred model is PNEUMATIC GRIPPER DIAM 16, model MHF2-16D Pneumatic motors (7, 8), Atlas Copco model LZB AR003-11 or another one with similar characteristics.

What is claimed is:

1. A device for carrying, handling and placing an explosive cone for the release of overhangs in underground mines, attachable to a semi-automated handling arm, the device comprising:
    a gripping system for the explosive cone including at least one of pneumatic cylinders with penetration points, tweezers with spike like penetration elements, or a gripper system for gripping the surface of the explosive cone;
    a support plate coupled to the gripping system;
    a fitting spring positioned between the gripping system and support plate;
    two pneumatic thrust cylinders configured to extend the gripping system;
    a pneumatic motor for rotation configured to rotate the gripping system;
    a pneumatic motor for inclination with a endless screw and crown system, the pneumatic motor for inclination being configured to adjust the inclination of the gripping system;

a joint support for securing the gripping system to the semi-automated handling arm; and a protective cover covering the pneumatic cylinder and the pneumatic motors.

2. The device for the carrying, handling and placing of an explosive cone according to claim 1, wherein the gripping system includes at least three pneumatic cylinders with penetration points.

3. The device for the carrying, handling and placing of an explosive cone according to claim 2, wherein the penetration points are horizontal.

4. The device for the carrying, handling and placing of an explosive cone according to claim 2, wherein the penetration points are perpendicular toe a side face or a casing of the explosive cone.

5. The device for the carrying, handling and placing of an explosive cone according to claim 1, wherein the pneumatic motor for inclination allows the gripping system to have an inclination between zero and ninety degrees.

6. The device for the carrying, handling and placing of an explosive cone according to claim 1, further comprising an inspection and orientation system which is integrated into the device.

7. The device for the carrying, handling and placing of an explosive cone according to claim 6, wherein the inspection and orientation system is made up of a video camera, six sensors and a blowing valve to clean the camera.

8. The device for the carrying, handling and placing of an explosive cone according to claim 7, wherein the orientation system with six sensors has three infrared sensors to measure the presence of objects, and three ultrasound sensors to measure distances, and wherein the three infrared sensors and the three ultrasound sensors are oriented in the direction of a target in a location plane.

9. The device for the carrying, handling and placing of an explosive cone according to claim 8, wherein the three infrared sensors and three ultrasound sensors, are located on an edge of the gripping system.

10. The device for the carrying, handling and placing of an explosive cone according to claim 1, wherein the gripping system includes three separate buffering inserts to support different explosive cone sizes.

11. The device for the carrying, handling and placing of an explosive cone according to claim 10, wherein the buffering inserts are made of soft material.

12. The device for the carrying, handling and placing of an explosive cone according to claim 11, wherein the soft material is made of rubber.

13. The device for the carrying, handling and placing of an explosive cone according to claim 11, wherein the soft material is made of sponge.

14. The device for the carrying, handling and placing of an explosive cone according to claim 1, wherein the gripping system includes tweezers which incorporates spike like penetration elements.

15. The device for the carrying, handling and placing of an explosive cone according claim 1, wherein the gripping system has a mechanism with two protection rings, one located on top of the gripping system and the other located below the gripping system.

16. The device for the carrying, handling and placing of an explosive cone according to claim 1, wherein the gripping system has a pneumatically triggered gripper which includes a pneumatic device for parallel movement to grip the explosive cone.

17. The device for the carrying, handling and placing of an explosive cone according to claim 1, wherein the gripping system has a rubber insert acting as a second line of support at the base of the explosive cone, allowing it to adapt to different explosive cone sizes.

18. The device for the carrying, handling and placing of an explosive cone according to claim 1, wherein the gripping system includes a gripper system that grips the surface of the explosive cone by engaging a ring system attached to the explosive cone.

19. The device for the carrying, handling and placing of an explosive cone according to claim 18, wherein the gripper system includes pneumatically triggered grippers that include a pneumatic device for parallel movements to grip the explosive cone.

20. The device for the carrying, handling and placing of an explosive cone according to claim 18, wherein the gripping system includes a rubber insert that acts as a second line of support at the base of the explosive cone, allowing it to adapt to different explosive cone sizes.

21. The device for the carrying, handling and placing of an explosive cone according to claim 1, wherein the device is operated remotely using a control system that regulates its movements and the gripping of the explosive cone.

\* \* \* \* \*

UNITED STATES PATENT AND TRADEMARK OFFICE
CERTIFICATE OF CORRECTION

PATENT NO. : 10,302,406 B2
APPLICATION NO. : 15/519488
DATED : May 28, 2019
INVENTOR(S) : Mario Vicuna Marin et al.

Page 1 of 1

It is certified that error appears in the above-identified patent and that said Letters Patent is hereby corrected as shown below:

In the Claims

Column 4, Line 14, Claim 4, "perpendicular toe a" should be --perpendicular to a--.

Column 8, Line 44, Claim 21, "movements" should be --movement--.

Signed and Sealed this
Thirtieth Day of July, 2019

Andrei Iancu
*Director of the United States Patent and Trademark Office*